(12) United States Patent
Jee et al.

(10) Patent No.: US 7,535,872 B2
(45) Date of Patent: May 19, 2009

(54) NETWORK APPARATUS AND PACKET ROUTING METHOD FOR UBIQUITOUS COMPUTING

(75) Inventors: Jung Hoon Jee, Daejeon (KR); Jae Hoon Nah, Daejeon (KR); Taek Yong Nam, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 691 days.

(21) Appl. No.: 10/923,184

(22) Filed: Aug. 19, 2004

(65) Prior Publication Data

US 2005/0105489 A1    May 19, 2005

(30) Foreign Application Priority Data

Nov. 13, 2003   (KR) ...................... 10-2003-0080080

(51) Int. Cl.
*G06F 15/16*   (2006.01)
(52) U.S. Cl. .......................... 370/331; 370/351; 370/392
(58) Field of Classification Search ................. 370/331, 370/351, 392
See application file for complete search history.

(56) References Cited

U.S. PATENT DOCUMENTS

| | | | |
|---|---|---|---|
| 6,438,585 B2 | 8/2002 | Mousseau et al. | |
| 6,591,306 B1 | 7/2003 | Redlich | |
| 6,621,810 B1 * | 9/2003 | Leung | 370/338 |
| 6,832,087 B2 * | 12/2004 | Gwon et al. | 455/436 |
| 6,901,429 B2 * | 5/2005 | Dowling | 709/203 |
| 6,970,445 B2 * | 11/2005 | O'Neill et al. | 370/338 |
| 2003/0182433 A1 * | 9/2003 | Kulkarni et al. | 709/228 |

OTHER PUBLICATIONS

"Mobile Agent Network for Supporting Personal Mobility", E. Jung, Y Park, C. Park, research has been supported by Korea Telecom, 6 pages.

* cited by examiner

*Primary Examiner*—Edan Orgad
*Assistant Examiner*—Jay P Patel
(74) *Attorney, Agent, or Firm*—Blakely Sokoloff Taylor & Zafman

(57) ABSTRACT

A network apparatus and packet routing method for ubiquitous computing are provided. In the network apparatus, a movement detection unit detects movement from a first network to a second network, and a movement address setting unit generates care-of-address (CoA) information corresponding to prefix information of the second network. A movement registration unit registers a movement address by transmitting a binding update message containing the generated CoA and home address (HoA) mapping information, to a home agent. A resource setting unit registers information on current terminal apparatuses among network terminal apparatuses on the second network. A packet distribution unit distributes the received packet to a current terminal apparatus corresponding to the application characteristic of the packet received from the home agent based on the information on the current terminal apparatuses.

12 Claims, 6 Drawing Sheets

NETWORK APPARATUS AND PACKET ROUTING METHOD FOR UBIQUITOUS COMPUTING

BACKGROUND OF THE INVENTION

This application claims the priority of Korean Patent Application No. 2003-80080, filed on Nov. 13, 2003, in the Korean Intellectual Property Office, the disclosure of which is incorporated herein in its entirety by reference.

1. Field of the Invention

The present invention relates to a network apparatus and packet routing method for ubiquitous computing, and more particularly, to a network apparatus and packet routing method capable of providing networking services to users by using a plurality terminals on a network in a ubiquitous computing environment to establish a user-oriented networking environment.

2. Description of the Related Art

Ubiquitous computing technology comes from a paradigm change from the conventional terminal-oriented computing environment toward a user-oriented computing environment, and by allowing a user to receive application services at any location of a network through a variety of terminal on the network, service absorption and user convenience are enhanced.

This ubiquitous computing technology is disclosed in the U.S. Pat. No. 6,438,585, "System and method for redirecting message attachments between a host system and a mobile data communication device", the U.S. Pat. No. 6,591,306, "IP network access for portable devices", and an article, "Mobile agent network for supporting personal Mobility", in International Conference on Information Network (ICOIN), 1998.

The technology disclosed in the U.S. Pat. No. 6,438,585, pays attention to the fact that a mobile data communication devices carried by a mobile user has a low processing power and usually is connected to a network wirelessly, and aims at providing an apparatus for selecting a minimum amount of information in data and transferring the selected information to a wireless device, while a large amount of data from a wire network is processed in a host system connected to the wire network. This system includes a host system connected to a wire network and a device connected to a wireless network. By a redirector program operating at a host system, a selective event message on a transferred packet is generated and transferred to the device such that load to the mobile devices decreases. By doing so, consumption of wireless low bandwidth resources can be reduced. Furthermore, it provides reduction of the load to a wireless device having a relatively low processing power.

Meanwhile, in the technology disclosed in the U.S. Pat. No. 6,591,306, when a mobile terminal accesses to a foreign network not to its home network, an access router assigns a temporary address for the mobile terminal, and for packet transmission and reception of the mobile terminal, the access router performs conversion of the home address and temporary address such that the mobile terminal can access the network without additional setting or changes in protocols. The system is formed with a guest terminal accessing a remote network and an access router supporting the guest terminal to access the network. When the guest terminal accesses the foreign network not its home network, the access router assigns a temporary address for the guest terminal and for packet transmission and reception of the mobile terminal, conversion of the home address and the temporary address is performed by the access router. Accordingly, the mobile terminal is allowed to access the network without additional setting or changes in protocols.

Meanwhile, in the technology disclosed in the article in the ICOIN, a logical mobile agent network on a layer higher than the physical Internet is suggested. It aims at providing user mobility on the Internet by moving a mobile agent when a user moves between networks. The system suggested in the article includes a mobile agent engine installed in a host system on the Internet, a mobile agent operating on an execution engine, and a servant object to solve the security problem of the mobile agent. As a user moves between networks, the mobile agent moves between execution engines, and transmits its location information to a fixed agent in the home network. The agent operating on an execution engine can operate by calling only an interface provided by a servant to prevent damage to the host system, such that the local security problem can be solved.

However, the conventional technologies do not suggest at all a structure for a user to receive application services through a variety of terminal on a network, the structure that is essential in establishing a user-oriented computing environment. Since user-oriented computing is performed in a ubiquitous computing environment, technologies to enhance service absorption and user convenience are essential, but the conventional technologies cannot provide a method to establish this user-oriented computing.

SUMMARY OF THE INVENTION

The present invention provides a network apparatus capable of providing networking services to a user by using a plurality of terminals on a network in a ubiquitous computing environment aiming at user-oriented networking.

The present invention also provides a packet routing method capable of providing networking services to a user by using a plurality of terminals on a network in a ubiquitous computing environment aiming at user-oriented networking.

According to an aspect of the present invention, there is provided a network apparatus for ubiquitous computing including: a movement detection unit which detects movement from a first network to a second network; a movement address setting unit which generates care-of-address (CoA) information corresponding to prefix information of the second network; a movement registration unit which registers a movement address by transmitting a binding update message containing the generated CoA and home address (HoA) mapping information, to a home agent; a resource setting unit which registers information on current terminal apparatuses among network terminal apparatuses on the second network; and a packet distribution unit which distributes the received packet to a current terminal apparatus corresponding to the application characteristic of the packet received from the home agent based on the information on the current terminal apparatuses.

According to another aspect of the present invention, there is provided a packet routing method including: detecting movement from a first network to a second network; generating care-of-address (CoA) information corresponding to prefix information of the second network; registering a movement address by transmitting a binding update message containing the generated CoA and home address (HoA) mapping information, to a home agent; registering information on current terminal apparatuses among network terminal apparatuses on the second network; identifying the application characteristic of a packet received from the home agent; and distributing the received packet to a current terminal apparatus corresponding to the identified application characteristic of the packet based on the information on the current terminal apparatuses.

According to the apparatus and method, a user can use a plurality of terminal residing on a network in a ubiquitous computing environment and the service absorption of the user and user convenience can be enhanced.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
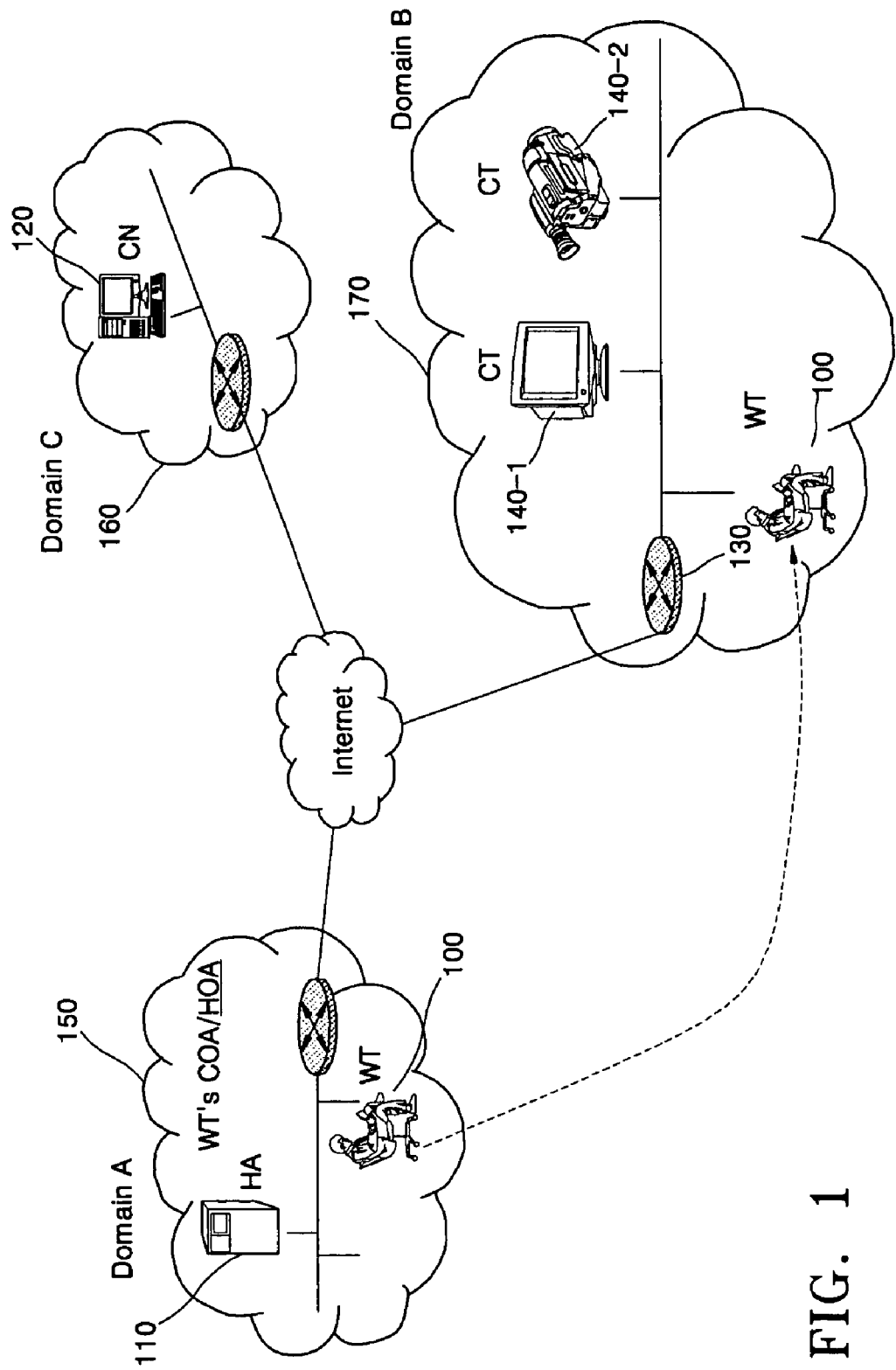
FIG. 1 is a diagram of the structure of an entire network including a network apparatus for ubiquitous computing according to the present invention.

FIG. 1 is a diagram of the structure of an entire network including a network apparatus for ubiquitous computing according to the present invention. Referring to FIG. 1, the entire network includes a network apparatus 100 for ubiquitous computing according to the present invention, a home agent (HA) 110, a corresponding node 120, an access router 130, and current terminals (CTs) 140-1 and 140-2.

The network apparatus 100 is a wearable terminal (WT) in the form of an attachment to the body of a user to provide user mobility. The mobility of this network apparatus 100 accommodates mechanisms providing the mobility of the conventional mobile IPv6 without any change. By doing so, it can guarantee user mobility with minimizing changes in the existing infrastructures.

The home agent 110 is located at network A 150 named as domain A, and performs mobility management of the network apparatus 100. Also, the home agent 110 transfers to the network apparatus 100 a packet which is received through the Internet from a remote corresponding node 120 located at network C 160 named as domain C. At this time, through a tunnel formed by using a tunneling technology, the packet is transferred from the home agent 110 to the network apparatus 100.

The access router 130 is located at network B 170 named as domain B, and performs routing a packet to be transferred to current terminals 140-1 and 140-2 located at network B. Also, the access router 130 distributes a packet which is received from the network apparatus 100 having entered into network B 170, to the current terminal 140-1 or 140-2 corresponding to the application characteristic of the received packet. In addition, according to a packet distribution request message received from the network apparatus 100, the access router 130 directly distributes a packet received from the network apparatus 100 to the current terminal.

Each of the current terminals 140-1 and 140-2 is an apparatus having an information processing function which a user directly uses to get application services. In a ubiquitous environment, the current terminals 140-1 and 140-2 are not limited to predetermined apparatuses and can be any apparatuses having functions for information processing and communication.

Figure 2:
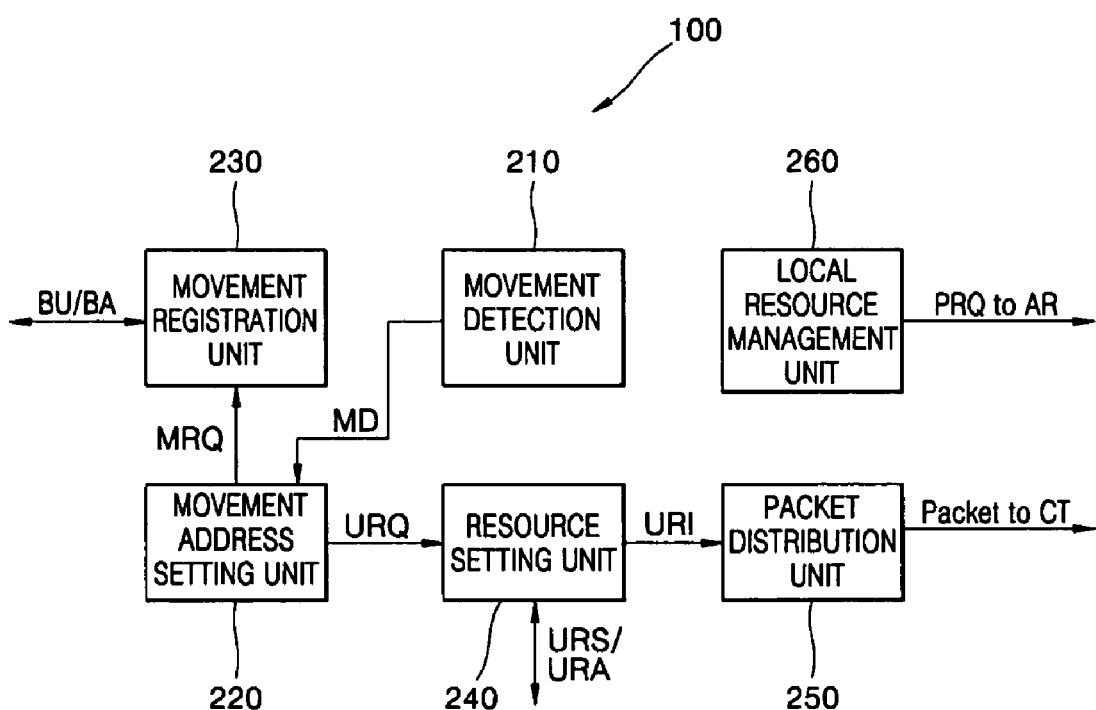
FIG. 2 is a block diagram of the structure of a network apparatus for ubiquitous computing according to the present invention.

FIG. 2 is a block diagram of the structure of a network apparatus for ubiquitous computing according to the present invention. Referring to FIG. 2, the network apparatus for ubiquitous computing according to the present invention includes a movement detection unit 210, a movement address setting unit 220, a movement registration unit 230, a resource setting unit 240, a packet distribution unit 250, and a local resource management unit 260.

The movement detection unit 210 detects the movement of the network apparatus 100 from a first network to a second network. If it detects the movement of the network apparatus 100, the movement detection unit 210 transfers a movement detection event to the movement address setting unit 220.

The movement address setting unit 220 generates care-of-address (CoA) information corresponding to the prefix information of the second network which the network apparatus 100 is visiting. After setting the CoA, the movement address setting unit 220, outputs a mobile registration request (MRQ) message to the movement registration unit 230. Also, the movement address setting unit 220 outputs a ubiquitous registration request (URQ) message to the resource setting unit 240 in order to identify ubiquitous resources of the second network which the network apparatus 100 is visiting at present.

The movement registration unit 230 transmits a binding update message containing mapping information of a home address (HoA) and the CoA generated by the movement address setting unit 220 to the home agent 110, and by doing so, registers the movement address of the network apparatus 100.

The resource setting unit 240 registers information on current terminals among terminal apparatuses existing in the second network through ubiquitous registration solicitation (URS)/ubiquitous router advertisement (URA). After completing registration of information on current terminals, the resource setting unit 240 informs the packet distribution unit 250 of a list of set terminals, through a ubiquitous registration indication (URI) message.

The packet distribution unit 250 generates current terminal profile information including the terminal list informed by the resource setting unit 240, analyzes the application characteristic of the packet based on the head information of the transmission layer and application layer of the packet transmitted to the network apparatus 100, and distributes the packet to a current terminal corresponding to the application characteristic of the packet.

The local resource management unit 260 identifies the available resources of the network apparatus 100 itself. The network apparatus 100 in the form of a wearable terminal which performs a sensor's role indicating the movement of the user is built to have a not high processing power due to the characteristic of the apparatus. If the network apparatus 100 having this low processing power performs the routing function continuously, then there will be a problem that when an application message with a large amount of data is transferred, the network apparatus 100 becomes a bottleneck of the entire services and prevents smooth services. To prevent this bottleneck problem due to the low processing power of the network apparatus 100, the local resource management unit 260 senses available resources of the network apparatus 100 in real time, and if the load by message routing becomes higher than a predetermined level, requests the access router 130 to perform message routing. If the identified resources of its own are less than a predetermined reference level, the local resource management unit 260 transmits information on current terminals and the packet received from the home agent 110, to the access router 130 located at the end of the second network, and requests the access router 130 to directly distribute the packet to current terminals corresponding to the application characteristic of the packet.

Figure 3:
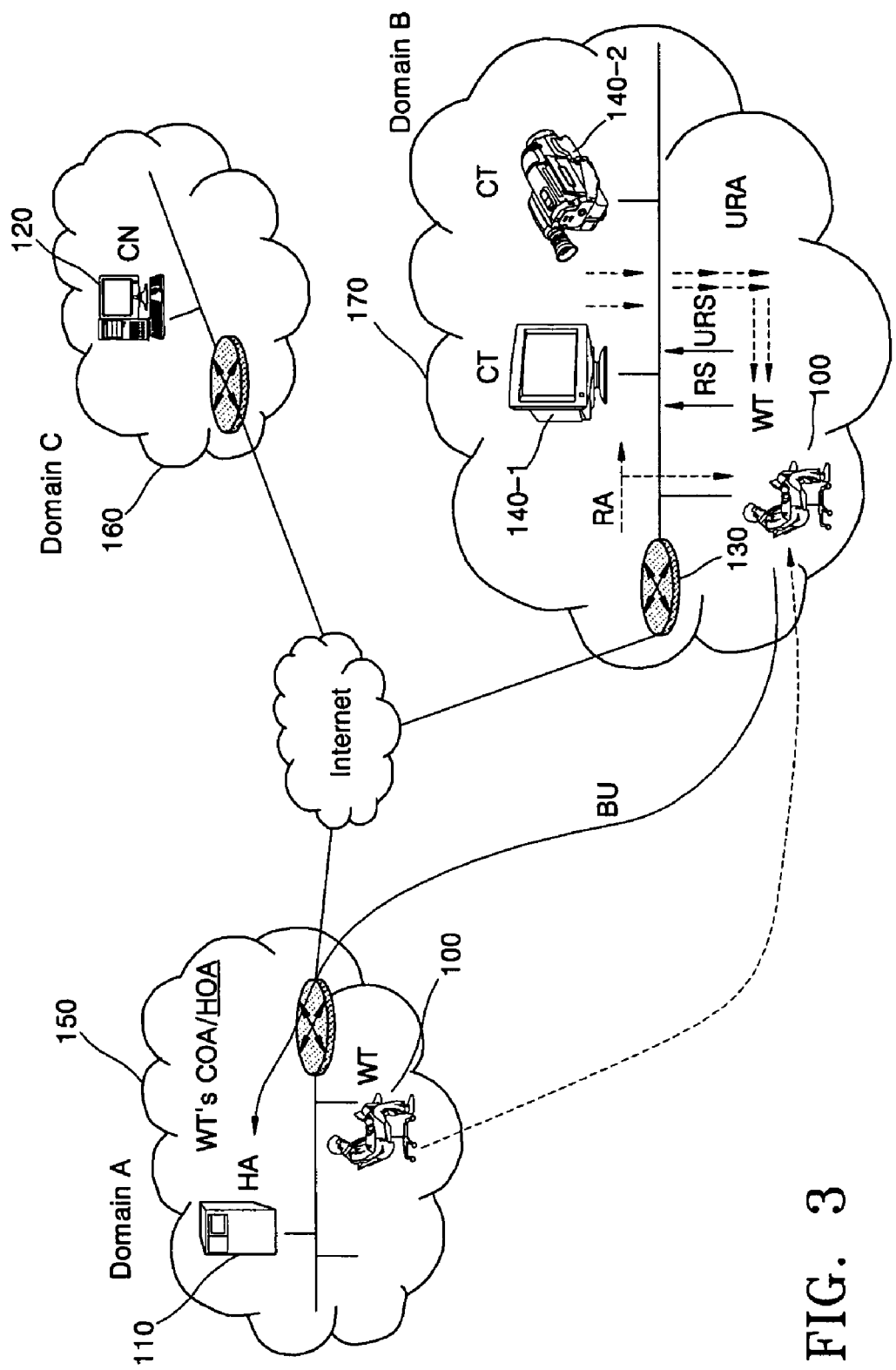
FIG. 3 is a schematic diagram showing a process in which when a network apparatus for ubiquitous computing according to the present invention moves, a movement address is registered with a home agent and the resources of the visited network are set.

FIG. 3 is a schematic diagram showing a process in which when the network apparatus 100 for ubiquitous computing according to the present invention moves, a movement address is registered with the home agent 110 and the resources of the visited network are set.

Referring to FIG. 3, if the user who was in network A 150 that is the home network moves into network B 170 with wearing the network apparatus 100, the movement detection unit 210 sets a CoA by exchanging router solicitation (RS)/router advertisement (RA) with the access router 130 located in network B 170. After setting the CoA, the resource setting unit 240 of the network apparatus identifies current terminals of network B (that is, resources of network B), by exchanging ubiquitous resource solicitation (URS)/ubiquitous router advertisement (URA) with terminals 140-1 and 140-2 on network B 170. Information on the current terminals is written in URR_List (ubiquitous resource reservation list) in the network apparatus 100. Meanwhile, by transmitting a biding update (BU) message including mapping information of the HoA and CoA, to the home agent 110, the movement registration unit 230 of the network apparatus 100 registers its current location information with the home agent 110.

Figure 4:
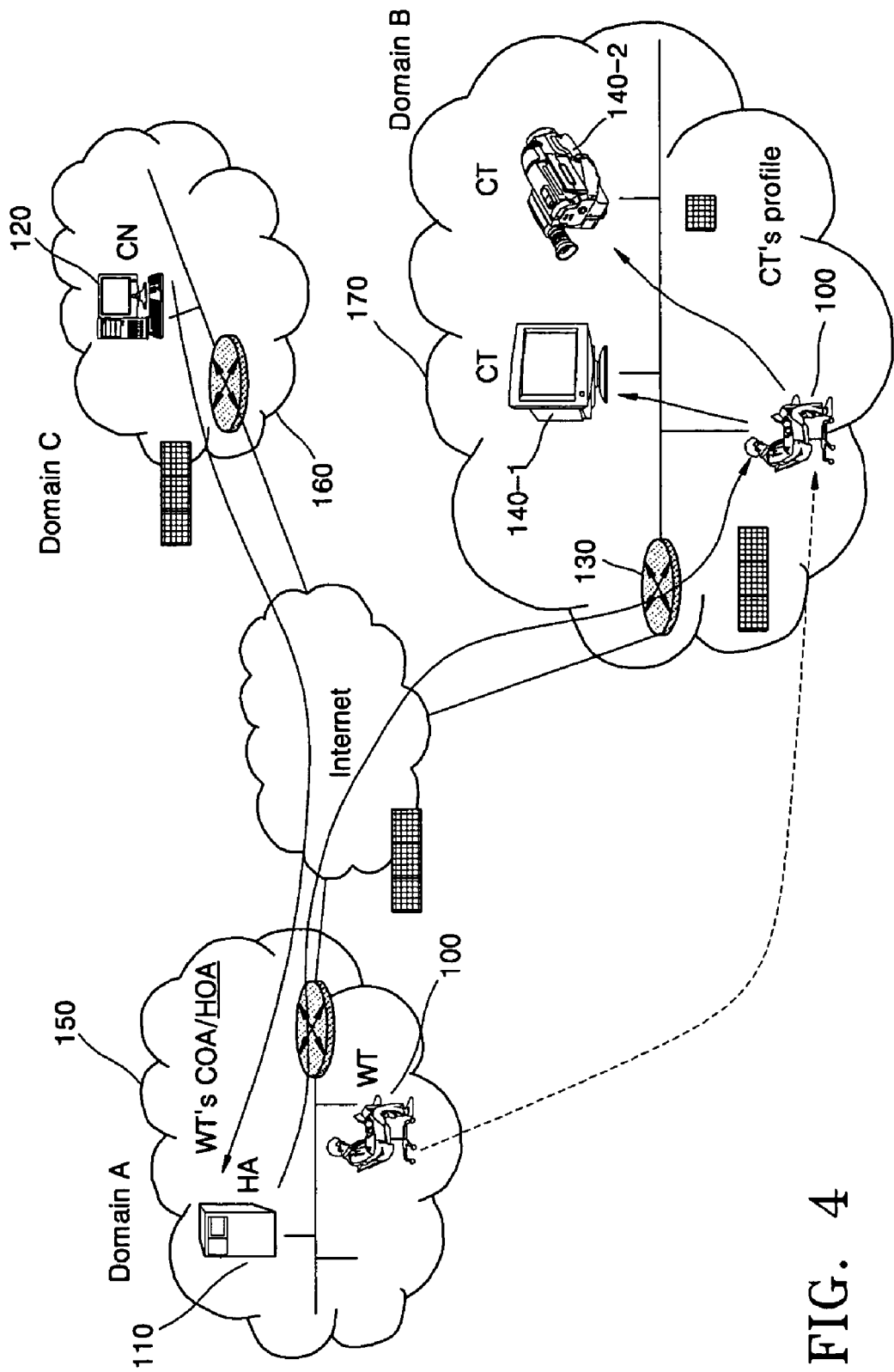
FIG. 4 is a schematic diagram showing a process in which a packet transmitted by a corresponding node in a remote place is transferred to current terminal apparatuses through a network apparatus for ubiquitous computing according to the present invention.

FIG. 4 is a schematic diagram showing a process in which a packet transmitted by the corresponding node 120 in a remote place is transferred to the current terminal apparatus 140-1 or 140-2 through the network apparatus 100 for ubiquitous computing according to the present invention.

Referring to FIG. 4, the corresponding node 120 located in network C 160 transmits a packet with the home address of the network apparatus 100 as the destination address. The packet is transferred to network A 150 based on the destination address and intercepted by the home agent 110. Referring to binding information of the network apparatus 100, the home agent 110 performs tunneling for the packet to network B 170 which the network apparatus 100 is visiting. The network apparatus 100 receiving the packet through tunneling checks the higher layer header of the packet, refers to URR_List, and performs routing to an appropriate current terminal 140-1 or 140-2.

Figure 5:
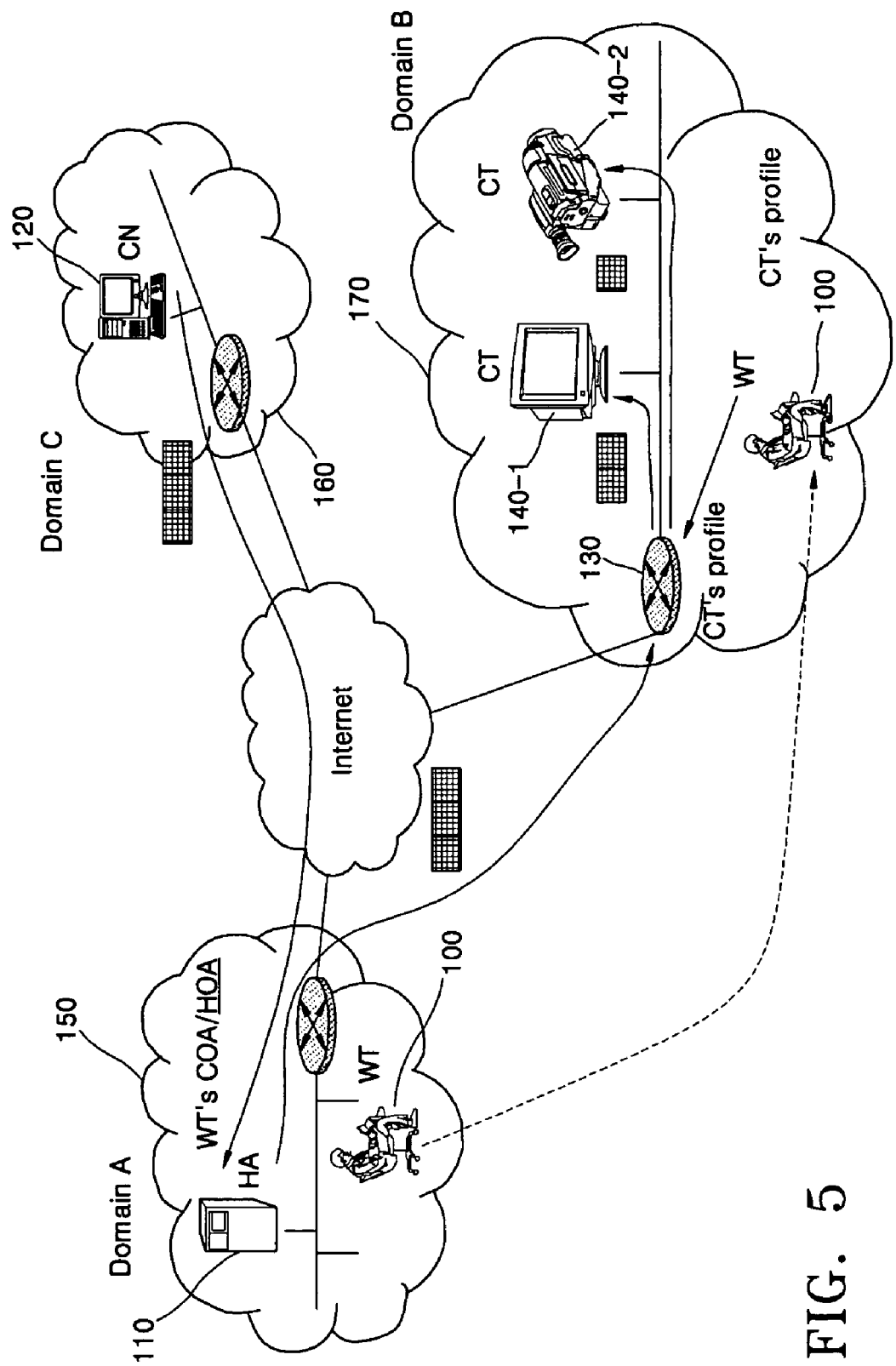
FIG. 5 is a schematic diagram showing a process in which a network apparatus for ubiquitous computing according to the present invention requests an access router located at the end of network B to distribute a packet.

FIG. 5 is a schematic diagram showing a process in which the network apparatus 100 for ubiquitous computing according to the present invention requests the access router 130 located at the end of network B 170 to distribute a packet.

Referring to FIG. 5, if it is confirmed that the available processing resources are dropped below a predetermined level, the local resource management unit 260 of the network apparatus 100 transmits a proxy reservation request (PRQ) message to the access router 130 of network B 170. The access router 130 stores profile information of the current terminals 140-1 and 140-2 for the network apparatus 100 included in the PRQ message. In the profile information, HoA, and CoA of the network apparatus 100 and the list of current terminals by application characteristics of packets are included. In this situation, if the corresponding node 120 located in network C 160 transmits a packet with the home address as the destination address, the packet is transferred to network A 150 based on the destination address, and then intercepted by the home agent 110. The home agent 110 refers to the binding information of the network apparatus 100, performs tunneling for the packet to network B 170 which the network apparatus 100 is visiting. The access router 130 of network B 170 analyzes the application characteristic of the transferred packet, refers to profile information of current terminals for the network apparatus 100 that is the destination of the packet, and then distributes the packet to the current terminal 140-1 or 140-2 corresponding to the application characteristic of the packet.

Figure 6:
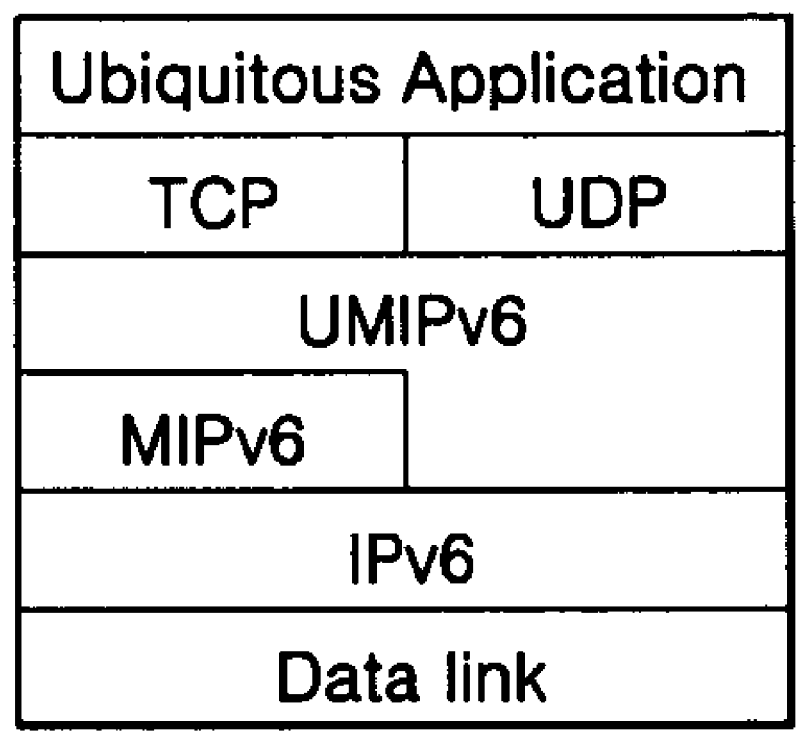
FIG. 6 is a diagram of the hierarchical structure of a Ubiquitous Mobile IPv6 (UMIPv6) protocol providing user mobility and a routing function between terminals so that a predetermined user can user a plurality of terminals.

FIG. 6 is a diagram of the hierarchical structure of a Ubiquitous Mobile IPv6 (UMIPv6) protocol providing user mobility and a routing function between terminals so that a predetermined user can use a plurality of terminals. Referring to FIG. 6, the network apparatus 100 providing the mobility transparently accommodates the hierarchical structure f the conventional MIPv6 mechanism. Also, through message routing in the transmission layer, a predetermined user is allowed to receive ubiquitous application services by using a plurality of terminals.

In the conventional network, a host system accessed by a user mainly processes user application services, while network intermediate nodes such as a router process packet routing and forwarding. In a ubiquitous environment, a user receives services by a plurality of terminals in a unified manner and accordingly, there is a need that the user terminal corresponding to the host system of the conventional system provides a routing function to other terminals. Also, when the evolving direction of computing is considered, it is clear that the computing will evolve to a network environment in a foreseeable future, in which a user can receive services through a plurality of terminals in a network which the user is located. Forming this one-to-multiple relation between a user and terminals is an essential technological element for a ubiquitous computing environment. The network apparatus and packet routing method for ubiquitous computing according to the present invention can provide user with an access to a plurality of terminals.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the network apparatus and packet routing method based on ubiquitous computing according to the present invention, user mobility can be perfectly guaranteed and by message routing in a network apparatus side, application services can be provided to a user through a plurality of terminals on neighboring networks whether or not the terminals belong to the user. This method can be applied to establishing a ubiquitous computing system as an essential technology element. Furthermore, the mobility of a network apparatus in the present invention employs the existing Mobile IPv6 mechanism as is such that modification of the existing infrastructure can be minimized and the delay time due to introduction of a new mechanism can be reduced.

What is claimed is:

1. A network apparatus for ubiquitous computing comprising:
   a movement detection unit which detects movement from a first network to a second network;
   a movement address setting unit which generates care-of-address (CoA) information corresponding to prefix information of the second network;
   a movement registration unit which registers a movement address by transmitting a binding update message containing the generated CoA and home address (HoA) mapping information, to a home agent;
   a resource setting unit which registers information on current terminal apparatuses among network terminal apparatuses on the second network through ubiquitous registration solicitation of ubiquitous router advertisement; and
   a packet distribution unit which distributes the received packet to a current terminal apparatus corresponding to the application characteristic of the packet received from the home agent based on the information on the current terminal apparatuses,
   wherein after said resource setting unit completes registration of the information on current terminal apparatus, requests said information, the resource setting unit informs the packet distribution unit of a list of the current terminal apparatus through ubiquitous registration indication messages.

2. The network apparatus of claim 1, wherein the movement address setting unit receives a movement detection (MD) event and generates a CoA using the prefix information on the second network.

3. The network apparatus of claim 1, wherein the movement detection unit detects movement between networks by exchanging router solicitation (RS) and router advertisement (RA) messages with an access router located at the end of the second network.

4. The network apparatus of claim 1, wherein if a mobile address registration request (MRQ) from the movement address setting unit is received, the movement registration unit transmits the binding update message to the home agent, and if a binding acknowledgement (BA) message from the home agent as a response to the binding update message is received, registers the movement address with the home agent.

5. The network apparatus of claim 1, wherein by exchanging ubiquitous router solicitation (URS) and ubiquitous router advertisement (URA) messages with the movement address setting unit, the resource setting unit reserves resources for current terminal apparatuses for a user in the second network.

6. The network apparatus of claim 1, wherein the packet distribution unit generates current terminal apparatus profile information based on information on the current terminal apparatuses set by a ubiquitous resources indication (URI) message received from the resource setting unit, and based on the generated current terminal apparatus profile information, distributes the received packet to a current terminal apparatus corresponding to the application characteristic of the received packet.

7. The network apparatus of claim 1, further comprising:
   a local resource management unit which identifies utilizable resources of its own, and if the identified resources of its own are less than a predetermined reference level, transmits information on the current terminal apparatus to an access router located at the end of the second network and requests the access router to directly distribute the packet to a current terminal apparatus corresponding to the application characteristic of the packet.

8. A packet routing method comprising:
   detecting movement from a first network to a second network;
   generating care-of-address (CoA) information corresponding to prefix information of the second network;
   registering a movement address by transmitting a binding update message containing the generated CoA and home address (HoA) mapping information, to a home agent;
   registering information on current terminal apparatuses among network terminal apparatuses on the second network through ubiquitous registration solicitation of ubiquitous router advertisement;
   identifying the application characteristic of a packet received from the home agent; and
   distributing the received packet to a current terminal apparatus corresponding to the identified application characteristic of the packet based on the information on the current terminal apparatuses of a list of the current terminal apparatus informed through ubiquitous registration indication messages.

9. The method of claim 8, wherein in detecting movement, movement between networks is detected by exchanging router solicitation (RS) and router advertisement (RA) messages with an access router located at the end of the second network.

10. The method of claim 8, wherein registering a movement address comprises: transmitting the binding update message to the home agent; receiving a binding acknowledgement (BA) message from the home agent as a response to the binding update message; and registering the movement address with the home agent.

11. The method of claim 8, wherein distributing the packet comprises:
    generating current terminal apparatus profile information based on information on the current terminal apparatuses; and distributing the received packet to a current terminal apparatus corresponding to the application characteristic of the received packet, based on the generated current terminal apparatus profile information.

12. The method of claim 8, wherein in distributing the packet, if utilizable resources of its own are less than a predetermined reference level, information on the current terminal apparatus is transmitted to an access router located at the end of the second network and the access router is requested to directly distribute the packet to a current terminal apparatus corresponding to the application characteristic of the packet.

* * * * *